April 2, 1935.  L. DUFAY  1,996,539
METHOD OF DECORATING OBJECTS AND DECORATED OBJECTS
OBTAINED BY MEANS OF THESE METHODS
Filed March 30, 1933  3 Sheets-Sheet 1
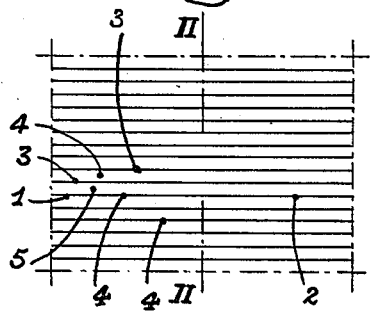
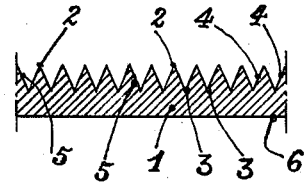
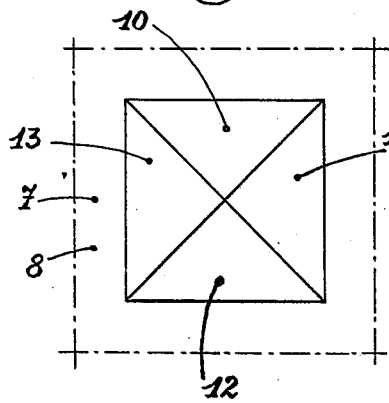
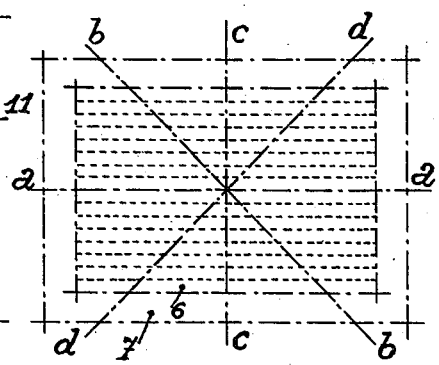
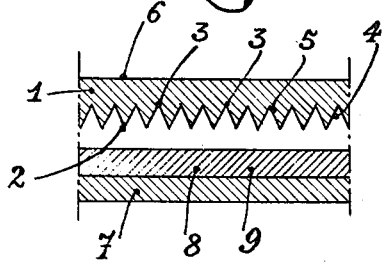
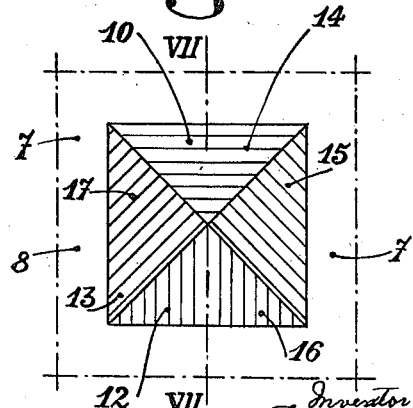

Patented Apr. 2, 1935

1,996,539

UNITED STATES PATENT OFFICE 1,996,539

METHOD OF DECORATING OBJECTS AND DECORATED OBJECTS OBTAINED BY MEANS OF THESE METHODS

Louis Dufay, Besancon, France

Application March 30, 1933, Serial No. 663,668
In France March 31, 1932

18 Claims. (Cl. 41—19)

The present invention relates to methods of decorating objects and decorated objects obtained by means of these methods.

The wings of certain Lepidoptera such for example as the Apaturas and Morphos produce an iridescence or a play of light of varying colours according to the directions or angles from which they are examined.

Observation of the structure of the parts which give rise to these coloured reflections has led the inventor to produce similar effects, and, in addition, remarkable relief effects, by the method which forms the object of the present invention.

According to this method:

1. There is formed, first of all, by any suitable known means, on one of the faces of a carrier, which is strong and resistant, and which, nevertheless, may be flexible, plastic, thin and transparent, a network of juxtaposed elements, formed by reliefs and depressions having sharp ridges and angular polished faces, which practically cannot be individually distinguished by the naked eye under normal conditions of observation. For convenience of description, this network is hereinafter called the "negative network".

2. A second carrier of any nature, flexible or rigid, is taken, but one of the faces of which is more impressionable than that of the negative network or, in other words, is moldable under pressure. A design may have been traced beforehand on the said impressionable face, and the face of the first carrier provided with the negative network of juxtaposed elements hereinbefore referred to is brought into intimate contact with the said impressionable face or surface.

3. On the free face of the first carrier, if it is thin and flexible, a pressure is exerted locally by any suitable means, mechanically or even by hand, for example, by means of a burnisher having a pointed end, rounded or flat, the pressure being sufficient to produce at the desired place on the second impressionable carrier employed a local impression or molding, which is the counterpart of the corresponding elements of the negative network, and which for this reason will be hereinafter called the "positive network".

4. The orientation of the negative network is changed in regard to the impressionable or moldable carrier, and there is again produced by local pressure in another desired part of the impressionable surface, but with a different orientation, a fresh positive partial impression or molding of the negative network; then by further changes of orientation of the initial negative network there is impressed in the second carrier further local impressions or moldings in such a way that the impressionable face is finally provided with local positive areas, more or less extensive, each of these areas being constituted by a group of furrows or grooves or juxtaposed positive networks, the various groups of furrows having a different direction from each other, and being adapted to give, in natural or artificial light, by reason of the variety of orientations which it is possible to control at will by the present process, effects of relief and depression similar to those given by the stereoscopic vision, and iridescent and varied reflection effects when the whole is viewed from a given angle or direction, these effects being a function of this angle or direction and changing therewith.

This set of differently orientated positive networks produced on any flexible or rigid surface, plain or curved, then constitutes an ensemble formed by a combination of quite characteristic elements, has also an aspect which is quite characteristic and remarkable, and constitutes by reason of this fact a new product capable of decorative, utilitarian or other extremely varied applications.

This product which I may call the "positive product", or simply "positive", is itself capable of being treated in various ways with the object of obtaining products still more characteristic and varied; thus for example the following may be mentioned:—

1. If the face of the carrier on which the areas of the positive networks have been stamped is a reflecting surface, these areas may be coloured, for example, by covering them by mechanical or other printing with varied transparent colours of any kind, the depth or intensity of which may also be very varied.

2. These transparent colours may, for instance, be formed by means of varnishes or lacquers or by baths of enamel, with the object of enabling the decorative product thus prepared to be subjected to a firing or burning which transforms the colours obtained into vitrified enamels, these enamels having the double advantage of giving to the finished products all the characteristics of ordinary enamel, with, in addition, those due to the means hereinbefore described.

3. The product thus obtained is itself capable of being reproduced by any suitable means, more particularly by galvano-plasty, molding, or by pressure or stamping on a more moldable or impressionable material than the initial product.

It may, more especially, be reproduced on celluloid softened by heating or by a suitable solvent.

The counter-type or reproduction obtained may then be used as an impression matrix for the impression, print, reproduction and multiplication of the positive product in an indefinite number of copies by any suitable means, especially by pressure or stamping.

The copies thus obtained by reproduction may, like the initial positive product, receive a complementary decoration formed by transparent colours or by enamels.

The negative or positive products, as well as each of the copies obtained by reproduction also constitute new industrial products which come within the scope of the present invention.

In the preceding description it has been indicated that the "initial positive" is obtained by means of a single network of juxtaposed elements, but, of course, without departing from the scope of the present invention, one can also obtain the said initial positive and one which gives a still greater variety of effects than that due to this method, by utilizing for the preparation of this initial positive not a single network of juxtaposed elements but a series of such networks of types distinct from each other, one of these networks being used for the preparation of one or several parts of the initial positive, another for the manufacture of one or several other parts of this positive, and so on until the said positive is completed.

Similarly in the preceding description it has been stated that the impressionable carrier used for making the initial positive product is a reflecting one, but when this initial positive is intended solely for reproduction any suitable carrier may be employed in its manufacture.

Furthermore, according to the present invention, also the reflecting surface of the impressionable carrier used for the preparation of an initial positive or obtained by reproduction, a positive which is intended to be observed by reflection may be formed by various materials, such as silver, aluminium, bronze, gold, et cetera, with the object of varying still further the appearance of the final decorative product and the effects given by viewing this product from different directions or angles.

In the preceding description it has been indicated that the juxtaposed elements of the network which is employed for the manufacture of the products obtained are invisible to the naked eye under normal conditions of observation; it follows from this, that for the manufacture of products, such as pictures and art objects, intended to be looked at from short distances, for example, from the distances usual when reading a book or written text, the elements of this network will be spaced from each other by distances which will be small fractions of a millimetre, for example, about a tenth, twentieth, or a thirtieth of a millimetre; on the other hand, for the manufacture of products intended to be observed at considerable distances, for example, decorative or advertising panels intended only to be observed from a distance of several metres or even tens of metres, the elements of the network may be of larger dimensions, for example of the order of a millimetre or a centimetre, and even more.

Finally the present invention has also for its object apparatus intended for the manufacture of the products above defined, and more especially, an apparatus, comprising a support provided with a negative network arranged in a mount adapted to rotate in the circular opening of a frame having a graduated circle drawn in front of a pointer on this mount.

In the annexed drawings, which are given by way of example only, and which do not in any way limit the scope of the invention:

Figure 1 shows on a greatly enlarged scale, and in front elevation, a portion of a carrier provided with a negative network of juxtaposed elements of the type above referred to.

Figure 2 is a section taken on the line II—II of Figure 1.

Figure 3 is a front view of a part of a positive product which is to be made, this part carrying the drawing or design of a decorative element to be made, for example, a diamond point.

Figure 4 shows the negative network turned over on the positive carrier to be made, this figure showing various orientations which can be given to this negative network.

Figure 5 shows in section the negative network thus turned over above the positive to be made and ready to be applied to the carrier to be treated.

Figure 6 shows a decorative element in accordance with the design shown in Figure 3 obtained with four different orientations of elements, by means of the negative network of Figures 1, 2, 4 and 5.

Figure 10:
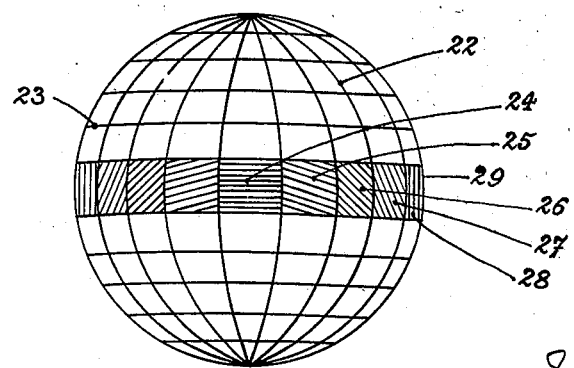

Figure 10 relates to the manufacture of a decorative element intended to give the effect of a sphere in relief.

Figure 11:
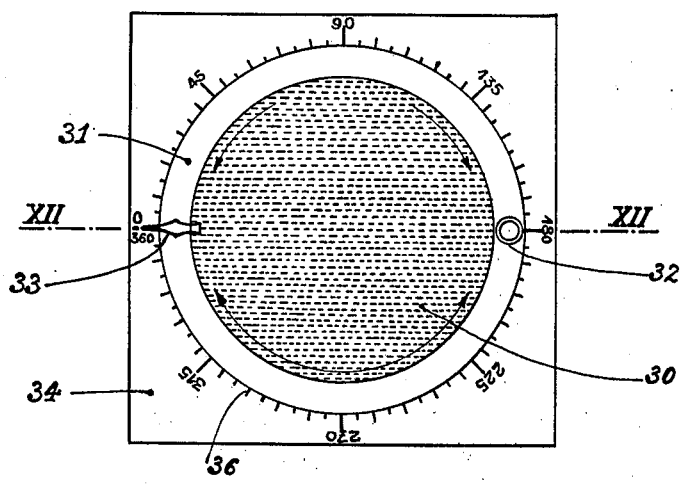

Figure 11 is a plan view of an apparatus which can be used for the production of a positive.

Figure 12:
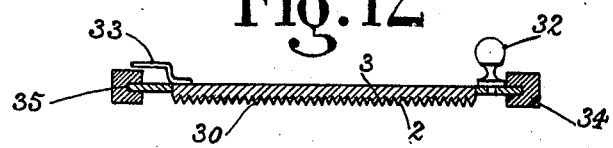

Figure 12 is a section on the line XII—XII of Figure 11.

In the various figures the same reference numbers denote the same parts.

In Figures 1 and 2, 1 is a strong and resistant carrier formed, for example, by a transparent material, such for instance as a sheet of transparent celluloid.

On one of the faces of this carrier there are formed by any suitable known means depressions and asperities, here obtained by forming parallel, rectilinear juxtaposed grooves, so as to form on this face parts in relief 2, and depressions 3, separated from each other by faces 4 and 5, which are seen under different angles or directions in relation to any original direction; these depressions and asperities make the "negative network".

The opposite face 6 of the carrier 1 of the "negative network" thus formed is free.

The second carrier 7 shown in Figures 3 and 5 and intended to form the positive product, is formed, for example, by a sheet of cardboard or paper, one of the faces 8 of which is of an impressionable or moldable nature; furthermore, in this case this face 8 is formed by a reflecting layer 9, consisting, for example, of a sheet or a deposit of tin, aluminium, silver, bronze, gold etc. A design may have been drawn or printed on this moldable or impressionable face, this design comprising, for instance, elementary surfaces 10, 11, 12, 13 bounded by straight lines, like those shown in the drawings, or curvilinear lines, or a mixture of these. To this face 8, or to the reflecting layer 9 when this latter exists on the carrier 7, the negative network 2, 3, 4, 5 of the carrier is applied.

The elements 2, 3, 4, 5 of this network are oriented in a direction a—a for instance (Figure 4) this direction according to circumstances being any one or determined by one or several of the parts of the contour of the element 10, for example, of the decoration to be produced on the carrier 7. When this is done, a sufficient pressure is exerted, mechanically or even by hand, for example, by means of a suitable tool, on the part of the face 6 of the negative network which is opposite the element 10 to produce on all the surface of this element 10 a positive network 14 (Figure 6) formed by relief and depressions. This network is the counterpart of the corresponding elements of the negative network. Then, either by displacing the negative network on the fixed moldable or impressionable carrier 7, or by displacing the carrier 7 in relation to the fixed negative network 1, or by simultaneously displacing these two parts in relation to one another, the orientation of this network 1 is changed in relation to the impressionable or moldable carrier, the grooves 2—2 of the network being brought, for example, parallel to the direction b—b, assuming that the impressionable carrier 7 has not moved. With this fresh orientation given to the negative network, there is exerted on the part of this network which is opposite a second element 11, a positive network 15 (Figure 6) of reliefs and depressions which is the counterpart of the corresponding parts of the negative network. By successively changing the direction of the negative network, according to the directions c—c and d—d by operations similar to the preceding one, there are obtained on the elements 12 and 13 of the design positive networks 16 and 17 having orientations corresponding to these directions c—c and d—d (Figure 6). The positive networks 14, 15—16, 17 thus combined on the face 7, when illuminated, give under normal conditions of observation previously defined effects distinct from each other, and the appearance of these combined effects is quite remarkable owing to the fact that by reason of their extreme relative fineness none of the constituent elements of these networks can be distinguished by the observer, as has been already stated, and that the effect of the whole of the various areas of the networks is alone perceived, in the same way that it is not possible to distinguish from each other by the naked eye the scales of a Morphocypris or similar butterfly, and that only the effects given by the various groups of scales of these insects are perceived.

Figure 7:
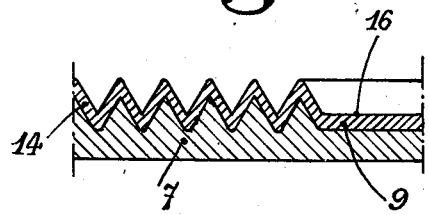
Figure 7 is a section of the decorative element of Figure 6 this section being taken on the line VII—VII of that figure.
Figure 8:
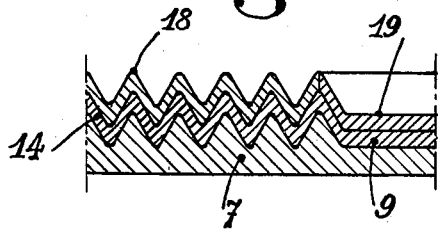
Figure 8 is a similar section after the addition of a coloured layer.

As has been stated, in order to vary still further the effects to be obtained on the positive product, this latter may be coloured. For this purpose, the area 14 may be covered with a transparent dye of a given colour and intensity, the area 15 may be covered by a transparent dye of a different colour and of a similar or different intensity, and similarly for each of the areas 16 and 17. On the other hand, each of the parts of the positive which is without a network may be painted in similar manner. In Figure 8 the colours thus applied to the networks 14 and 16 are shown in 18 and 19.

Each colour used may also be formed by a transparent coloured vitrifiable bath. In this case, if the carrier 7 consists of a material resistant to heat, the positive product may be subjected to a firing which vitrifies the enamel, and gives to the positive the appearance of a product in which the relief effects, the iridescence, and the luminous effects due to the various orientations of the networks combine with those due to the enamels, and in which the networks are protected from any accidental damage.

Figure 9:
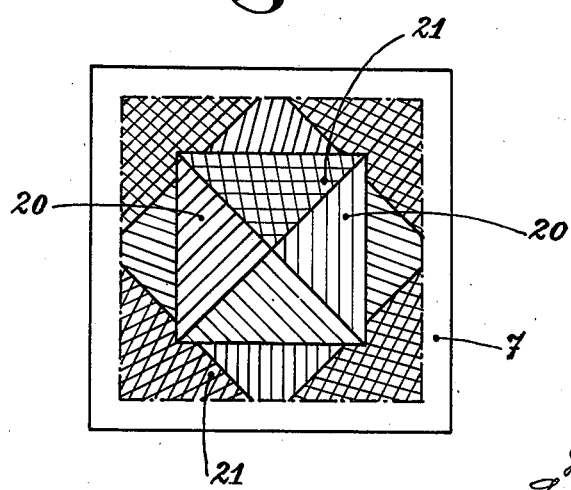
Figure 9 shows another decorative element, obtained on a positive having a design similar to that in Figure 3, but having twelve areas of differently orientated networks, several of which are formed by crossed elements.

Figure 9 shows in front elevation a part of a similar positive product, comprising a design derived from that shown in Figure 6, in which varied orientations have been given to the networks and in which, in order to vary the effects, use has been made of two kinds of networks, namely, simple networks 20 and crossed networks 21. These crossed networks can be made either in two operations by means of a simple negative network applied successively in two different directions on the carrier 7, or in one operation by means of a double negative network, that is to say, comprising elements crossing each other at all desired angles. The decorative product of the type of this figure gives reflections similar to those produced by the cutting of precious stones.

Of course, in each of these networks the reflecting layer 9 may be applied to the carrier 7 of the positive network only after the impression of the networks in this carrier. When this reflecting layer 9 is thus applied after the impression of the networks, it may be obtained by any suitable means for example by spraying or by galvano-plasty.

As has been stated, the drawings accompanying the present specification are purely diagrammatic, and it must be understood that the various lines of the negative and positive networks employed are invisible to the naked eye under normal conditions of observation, that is to say, are distant from each other by the fraction of a millimetre; about a tenth, a twentieth, or a thirtieth of a millimetre in case of networks intended to be observed at short range, for example, at normal reading distance. This spacing, may, however be much greater and be of the order of a millimetre, a centimetre or more in the case of positive networks intended to be observed at distances of several metres, tens of metres, or more.

Similarly, in these figures, it has been assumed that the network was formed by a single set of identical and juxtaposed grooves, but of course there is nothing absolute in this arrangement; thus, in the figures, the faces 4 and 5 of each groove are equally inclined in relation to the face 6 of the carrier 1, but to vary the angles these faces may be unequally inclined in regard to the face 6; one of them may even be perpendicular to this face 6; similarly, the grooves may be spaced apart, the upper ridges 2 or lower ones 3 of these grooves being then replaced by plane and polished parts of any width or desired form. Instead of being straight, each groove may also have a curvilinear, zig-zag, or other form.

As has been stated, double or even multiple networks, that is to say, comprising grooves crossing each other at any angle may also be used for the formation of the negative network.

Finally, the negative network may also comprise any desired combination of grooves of the types mentioned.

The formation of the negative network by means of linear grooves is not in any way limitative; negative networks formed by regular or irregular juxtaposed facets made in any other manner may also be utilized in carrying out the invention.

Each of these negative networks enables products to be obtained in the manner described comprising the most varied designs, also each of these designs to be treated in the most varied ways at the time of making the positive networks, then each positive network obtained direct or by reproduction coloured also in an infinite number of ways. The invention thus has a field of application of a technical richness which is really infinite.

Figure 10 shows how, by means of the method forming the object of the present application, it is possible to produce a decorative motif giving the effect of a sphere in relief. After having drawn a circle, this circle is divided into a plurality of elements, for example, by means of lines 22, 23 recalling the terrestrial latitudes and longitudes. Each curvilinear polygon thus obtained is treated like each zone or area of the preceding figures, the orientation of the elements of the networks varying progressively on the same band, for example, in passing from the central area 24 to the edge 29 by the intermediate areas 25, 26, 27, 28. A particular relief effect is thus obtained, and once the whole circle is treated, the effect of spherical relief approaches more closely that given by the sphere, the greater the number of areas into which the circle has been divided. In a similar manner by suitable divisions and other varied orientations in a circle a decorative motif is obtained which gives the impression of a hollow sphere. Thus as one is able by the method forming the object of the invention to obtain any effect of a spherical object, either in relief or in intaglio, it is evident that objects of any projecting or re-entrant form may be represented by means of the invention with remarkable effects of relief and depression.

The apparatus shown by way of example in Figures 11 and 12 is intended to enable any decorative or other object to be made simply and rapidly in accordance with the invention.

This apparatus comprises:—

1. A disc 30 provided with a negative network, for example, a network of relief and depressions 2, 3, similar to that in Figure 1, the elements of this network being of any desired angles or dimensions as stated.

2. An annular mount 31 in which this disc is set, this mount being provided with an operating knob or handle 32 and an indicator or pointer 33.

3. A frame 34 for receiving the said circular mount, this frame being provided for this purpose with a groove 35. A graduation 36, in degrees for instance, is formed on the circular edge of the said mount.

In these conditions, by keeping the edges of the frame with fixed orientations in its displacements, and turning the network by hand by the knob, it is possible by the pointer and the graduation 36 to bring the lines of the network 30 strictly into any desired orientation and in an instantaneous manner. The production of a network is, in this way, rendered particularly simple and rapid. This apparatus is of course, only given by way of example, and numerous other types of apparatus may be constructed for the same purpose.

I declare that what I claim is:—

1. A method of decorating objects consisting in using a negative network made of juxtaposed reliefs and depressions formed in the surface of one carrier and spaced at distances capable of producing selective degrees of reflection of white light when viewed in different directions and without color effects, bringing the said negative network into contact with the surface of a second carrier to be decorated, the said surface being more moldable or impressionable than that of the carrier of the negative network, applying pressure to the carrier of the negative network to form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network, constituting an ensemble made of local positive networks having desired different directions from each other, according to the decoration to be obtained.

2. A method of decorating objects consisting in using a negative network made of juxtaposed reliefs and depressions which include a series of angular polished faces, incapable of being distinguished by the naked eye and incapable of causing diffraction color effects and formed in the surface of one carrier, bringing the said negative network into contact with the surface of a second carrier to be decorated, the said surface being more moldable or impressionable than that of the carrier of the negative network, applying pressure to the carrier of the negative network to form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network, constituting an ensemble made of local positive networks having desired different directions from each other, according to the decoration to be obtained.

3. A method of decorating objects consisting in using a negative network made of juxtaposed reliefs and depressions formed in the surface of one carrier and spaced at distances capable of producing selective degrees of reflection of white light when viewed in different directions and without color effects which is strong and resistant, bringing the said negative network into contact with the surface of a second carrier to be decorated, the said surface being more moldable or impressionable than that of the carrier of the negative network, applying pressure to the carrier of the negative network to form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network, constituting an ensemble made of local positive networks having desired different directions from each other, according to the decoration to be obtained.

4. A method of decorating objects consisting in using a negative network made of juxtaposed reliefs and depressions formed in the surface of one carrier and spaced at distances capable of producing selective degrees of reflection of white light when viewed in different directions and without color effects which is flexible, bringing the said negative network into contact with the surface of a second carrier to be decorated, the said surface being more moldable or impressionable than that of the carrier of the negative network, applying pressure to the carrier of the negative network to deform the same and thereby form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network, constituting an ensemble made of local positive networks having desired different directions from each other, according to the decoration to be obtained.

5. A method of decorating objects consisting in using a negative network made of juxtaposed reliefs and depressions formed in the surface of one carrier and spaced at distances capable of producing selective degrees of reflection of white light when viewed in different directions and without color effects which is transparent bringing the said negative network into contact with the surface of a second carrier to be decorated, the said surface being more moldable or impressionable than that of the carrier of the negative network and having a pattern thereon visible through said one carrier, applying pressure to the carrier of the negative network to form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network and by guidance of said pattern, constituting an ensemble made of local positive networks having desired different directions from each other according to the decoration to be obtained.

6. A method of decorating objects consisting in using a negative network made of juxtaposed reliefs and depressions formed in the surface of one carrier and spaced at distances capable of producing selective degrees of reflection of white light when viewed in different directions and without color effects which is strong and resistant, flexible and transparent, bringing the said negative network into contact with the surface of a second carrier to be decorated, the said surface being more moldable or impressionable than that of the carrier of the negative network, applying pressure to the carrier of the negative network to form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network, constituting an ensemble made of local positive networks having desired different directions from each other, according to the decoration to be obtained.

7. A method of decorating objects consisting in using a negative network made of juxtaposed reliefs and depressions formed in the surface of one carrier and spaced at distances capable of producing selective degrees of reflection of white light when viewed in different directions and without color effects, bringing the said negative network into contact with the metallic surface of a second carrier or object to be decorated, the said surface being reflecting and more moldable or impressionable than that of the carrier of the negative network, applying pressure to the carrier of the negative network to form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network, constituting an ensemble made of local positive networks having desired different directions from each other, according to the decoration to be obtained.

8. A method of decorating objects consisting in using a negative network made of juxtaposed reliefs and depressions formed in the surface of one carrier and spaced at distances capable of producing selective degrees of reflection of white light when viewed in different directions and without color effects, bringing the said negative network into contact with the surface of a second carrier to be decorated, the said surface being more moldable or impressionable than that of the carrier of the negative network, applying pressure to the carrier of the negative network to form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network, constituting an ensemble made of local positive networks having desired different directions from each other, according to the decoration to be obtained, and applying a transparent colouring or tinting material to the surface of the ensemble of networks so obtained.

9. A method of decorating objects consisting in using a negative network made of juxtaposed reliefs and depressions formed in the surface of one carrier and spaced at distances capable of producing selective degrees of reflection of white light when viewed in different directions and without color effects, bringing the said negative network into contact with the surface of a second carrier to be decorated, the said surface being more moldable or impressionable than that of the carrier of the negative network, applying pressure to the carrier of the negative network to form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network, constituting an ensemble made of local positive networks having desired different directions from each other, according to the decoration to be obtained, applying a transparent colouring or tinting material consisting of a substance capable of yielding a transparent tinted enamel on firing, to the surface of the ensemble of networks so obtained and firing the said colouring or tinting material.

10. A method of decorating objects consisting in using a negative network made of juxtaposed reliefs and depressions formed in the surface of one carrier and spaced at distances capable of producing selective degrees of reflection of white light when viewed in different directions and without color effects, bringing the said negative network into contact with the surface of a second carrier to be decorated, the said surface being more moldable or impressionable than that of the carrier of the negative network, applying pressure to the carrier of the negative network to form a positive network or impression on a part of the surface of the second carrier to be decorated, relieving said pressure, changing the orientation of the negative network with respect to the said second carrier and again forming, by pressure on the negative network, a positive network on another part of the surface of the said carrier and, so by any desired number of changes of orientation of the initial negative network, constituting an ensemble made of local positive network having desired different directions from each other, according to the decoration to be obtained, and forming a counter-type of the said ensemble, the said counter-type being capable of being used as an impression matrix for making an indefinite number of positive products.

11. A method of decorating objects consisting in using an ensemble made of local positive networks each of which is made of juxtaposed lines of reliefs and depressions formed in the surface of an object, the said networks having desired different directions from each other and spaced a distance incapable of being distinguished by the observer at a normal distance of observation and incapable of causing diffraction color effects, forming a counter-type of the said ensemble, and using the said counter-type as an impression matrix for decorating any desired number of objects with local positive networks identical to the original positive networks of the said ensemble.

12. A method of decorating objects consisting in applying thereto under pressure a harder negative network consisting of a series of lines of juxtaposed reliefs and depressions to form a positive network on the surface of the softer object, spaced apart a distance of not less than one-thirtieth of a millimeter whereby to avoid diffraction effects, the individual reliefs and depressions being imperceptible to the eye at a normal distance for viewing the object relieving the pressure, removing the negative network, changing its orientation with respect to the object and again applying pressure and repeating the process as often as desired.

13. A decorated product characterized by a surface presenting to the eye of the observer reflections changing in light intensity according to the directions or angles from which they are observed, the product having at said surface areas comprising juxtaposed lines of reliefs and depressions spaced a distance imperceptible to the observer at the normal distance of observation, said spacing distance being so great that diffraction color effects do not cause selective changes in the reflections, the lines in the different areas being orientated at different angles so that the light intensity effects therefrom produce the appearance of lighter and darker areas from various angles of observation.

14. A decorated product characterized by a surface presenting to the eye of the observer reflections changing in light intensity according to the directions or angles from which they are observed, the product having at said surface areas comprising juxtaposed lines of reliefs and depressions spaced a distance imperceptible to the observer at the normal distance of observation, said spacing distance being so great that diffraction color effects do not cause selective changes in the reflections, the lines in the different areas being orientated at different angles so that the light intensity effects therefrom produce the appearance of lighter and darker areas from various angles of observation, and a layer of transparent coloring or tinting material located upon at least one of said areas.

15. A counter-type obtained by counter-reproduction of a product provided with a surface presenting to the eye of the observer reflections changing according to the directions or angles from which they are observed, this product comprising reflecting networks or areas of reflecting networks having juxtaposed elements, said network including pluralities of lines spaced a distance imperceptible to the observer at the normal distance of observation, said spacing distance being so great that diffraction color effects do not cause selective changes in the reflections, the different orientations of which producing the variety of the reflections have been controlled at will at the time of the manufacture of this product, the said counter-type being applicable to the reproduction of an indefinite number of copies of the original product.

16. An apparatus intended for decorating objects comprising a carrier provided on its bottom face with a negative network consisting of a series of juxtaposed reliefs and depressions incapable of being distinguished by the naked eye and incapable of causing diffraction color effects, a mount for said carrier, a frame having a circular opening for said mount, a graduated circle on said frame, and a pointer on said mount.

17. An apparatus intended for decorating objects comprising a transparent carrier provided on its bottom face with a negative network consisting of a series of juxtaposed reliefs and depressions incapable of being distinguished by the naked eye and incapable of causing diffraction color effects, a mount for said carrier, a frame having a circular opening for said mount, a graduated circle on said frame, and a pointer on said mount.

18. An apparatus intended for decorating objects comprising a transparent and flexible carrier provided on its bottom face with a negative network consisting of a series of juxtaposed reliefs and depressions incapable of being distinguished by the naked eye and incapable of causing diffraction color effects, a mount for said carrier, a frame having a circular opening for said mount, a graduated circle on said frame, and a pointer on said mount.

LOUIS DUFAY.